(12) United States Patent
Wang et al.

(10) Patent No.: US 10,173,636 B2
(45) Date of Patent: Jan. 8, 2019

(54) SEATBELT BUCKLE ASSEMBLIES AND SEAT ASSEMBLIES INCLUDING THE SAME

(71) Applicant: Ford Global Technologies, LLC, Dearborn, MI (US)

(72) Inventors: Tony Wang, Nanjing (CN); Angel Ding, Nanjing (CN); Fiona Yang, Nanjing (CN); Tina Li, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 15/365,492

(22) Filed: Nov. 30, 2016

(65) Prior Publication Data

US 2017/0174177 A1    Jun. 22, 2017

(30) Foreign Application Priority Data

Dec. 21, 2015  (CN) .......................... 2015 1 0965237

(51) Int. Cl.
*B60R 22/26* (2006.01)
*B60R 22/18* (2006.01)
*A44B 11/25* (2006.01)

(52) U.S. Cl.
CPC .......... *B60R 22/26* (2013.01); *A44B 11/2503* (2013.01); *B60R 22/18* (2013.01); *B60R 2022/1806* (2013.01)

(58) Field of Classification Search
CPC ... B60R 22/18; B60R 22/26; B60R 2022/029; B60R 2022/1806; A44B 11/2503

USPC ............................. 280/801.2; 297/480, 481
See application file for complete search history.

(56) References Cited

U.S. PATENT DOCUMENTS

| 4,132,434 | A | * | 1/1979 | Takahashi | ............... B60R 22/26 280/801.1 |
|---|---|---|---|---|---|
| 5,064,220 | A | * | 11/1991 | Ogawa | ................... B60R 22/26 180/268 |
| 7,178,876 | B2 | * | 2/2007 | Borgward | ............... B60R 22/18 280/801.1 |
| 7,229,135 | B2 | | 6/2007 | Hyatt et al. | |
| 7,497,474 | B2 | | 3/2009 | Sanchez et al. | |
| 7,658,443 | B2 | | 2/2010 | Musale | |
| 8,047,615 | B2 | | 11/2011 | Marriott et al. | |
| 8,622,430 | B2 | | 1/2014 | Letz et al. | |
| 2002/0050707 | A1 | * | 5/2002 | Nishide | ................... B60R 22/22 280/801.1 |
| 2015/0115588 | A1 | * | 4/2015 | Storck | .................... B60R 22/26 280/801.1 |

FOREIGN PATENT DOCUMENTS

| DE | 102008052332 A1 | * | 4/2010 | ............. B60R 22/18 |
| EP | 1223087 A1 | * | 7/2002 | .......... A44B 11/2503 |

* cited by examiner

*Primary Examiner* — Milton Nelson, Jr.
(74) *Attorney, Agent, or Firm* — Vichit Chea; Mohr IP Law Solutions, PC

(57) ABSTRACT

The seatbelt buckle assembly comprises a buckle; a buckle supporting member connected to the buckle and including thereupon a first aperture and an opposing second aperture spaced apart along a width direction together to receive a fastener for assembling the buckle supporting member to the structural frame; and a spring to contact the buckle supporting member and the structural frame.

18 Claims, 3 Drawing Sheets

SEATBELT BUCKLE ASSEMBLIES AND SEAT ASSEMBLIES INCLUDING THE SAME

RELATED APPLICATION

This application claims the benefit of Chinese Patent Application No.: CN 201510965237.8 filed on Dec. 21, 2015, the entire contents thereof being incorporated herein by reference.

TECHNICAL FIELD

The present application relates to a seatbelt buckle assembly and a seat assembly including the same.

BACKGROUND

In vehicle, a seatbelt buckle assembly is generally provided adjacent to a vehicle seat, for instance, mounted to a seat frame, a seat guiding rail or a vehicle floor. U.S. Pat. No. 7,497,474 discloses an adjustable buckle.

SUMMARY

According to one aspect of the present disclosure, the present invention provides a seatbelt buckle assembly, which includes a buckle; a buckle supporting member connected to the buckle and including thereupon a first aperture and an opposing second aperture spaced apart along a width direction together to receive a fastener for assembling the buckle supporting member to the structural frame; and a spring to contact the buckle supporting member and the structural frame.

In another embodiment, the buckle supporting member includes a first part and a second part, the first aperture and the second aperture being defined on the first part and the second part, respectively.

In another embodiment, the first part is connected to the second part, and forms an angle with the second part, wherein the first and the second parts are integrally formed as one-piece.

In another embodiment, the buckle supporting member further includes a middle part positioned between the first part and the second part, and the first part is substantially parallel to the second part.

In another embodiment, the buckle supporting member further includes a middle part positioned between the first part and the second part, and has a first angle with the first part and a second angle with the second part, and each of the first angle and the second angle being greater than zero and less than 120 degrees.

In another embodiment, the first part, the second part and the middle part are integrally formed as one-piece.

In another embodiment, the spring includes a first end, a second end and a body positioned there-between, the first end and second end of the spring contact the first part and second part of the buckle supporting member, respectively.

In another embodiment, at least a portion of the body of the spring is positioned between the first and second parts of the buckle supporting member along the width direction.

In another embodiment, the first part further includes a third aperture to receive the first end of the spring at an assembled position.

In another embodiment, the second part further includes protrusion to contact the second end of the spring at an assembled position.

In another embodiment, the buckle supporting member include a main body, wherein each of the first part d the second part extends from an end of the main body and away from the main body and then bends down.

In another embodiment, the buckle supporting member include a main body, wherein each of the first part and the second part extends from an end of the main body and away from the main body and then bend down, and the first and second parts form a loop.

According to another aspect of the present disclosure, the present invention provides a seat assembly, which includes a seat frame; a buckle; a buckle supporting member connected to the buckle and including thereupon a first aperture and an opposing second aperture spaced apart along a width direction together to receive a fastener for assembling the buckle supporting member to the seat frame; and a spring to contact with the buckle supporting member and the seat frame.

In one embodiment, the seat frame includes a positioning hole to contact an end of the spring.

In another embodiment, the buckle supporting member includes a first part and a second part, the first and second apertures respectively being defined on the first and second parts, wherein the spring includes a first end, a second end and a body positioned there-between, the first end and second end of the spring respectively contacting the first part and second part of the buckle supporting member.

In another embodiment, the first part further includes a third aperture to receive the first end of the spring at an assembled position.

In another embodiment, the second part further includes a protrusion to contact the second end of the spring at an assembled position.

One or more advantageous features as described herein are believed to be readily apparent from the following detailed description of one or more embodiments when taken in connection with the accompanying drawings.

DETAILED DESCRIPTION OF ONE OR MORE EMBODIMENTS

Figure 1:
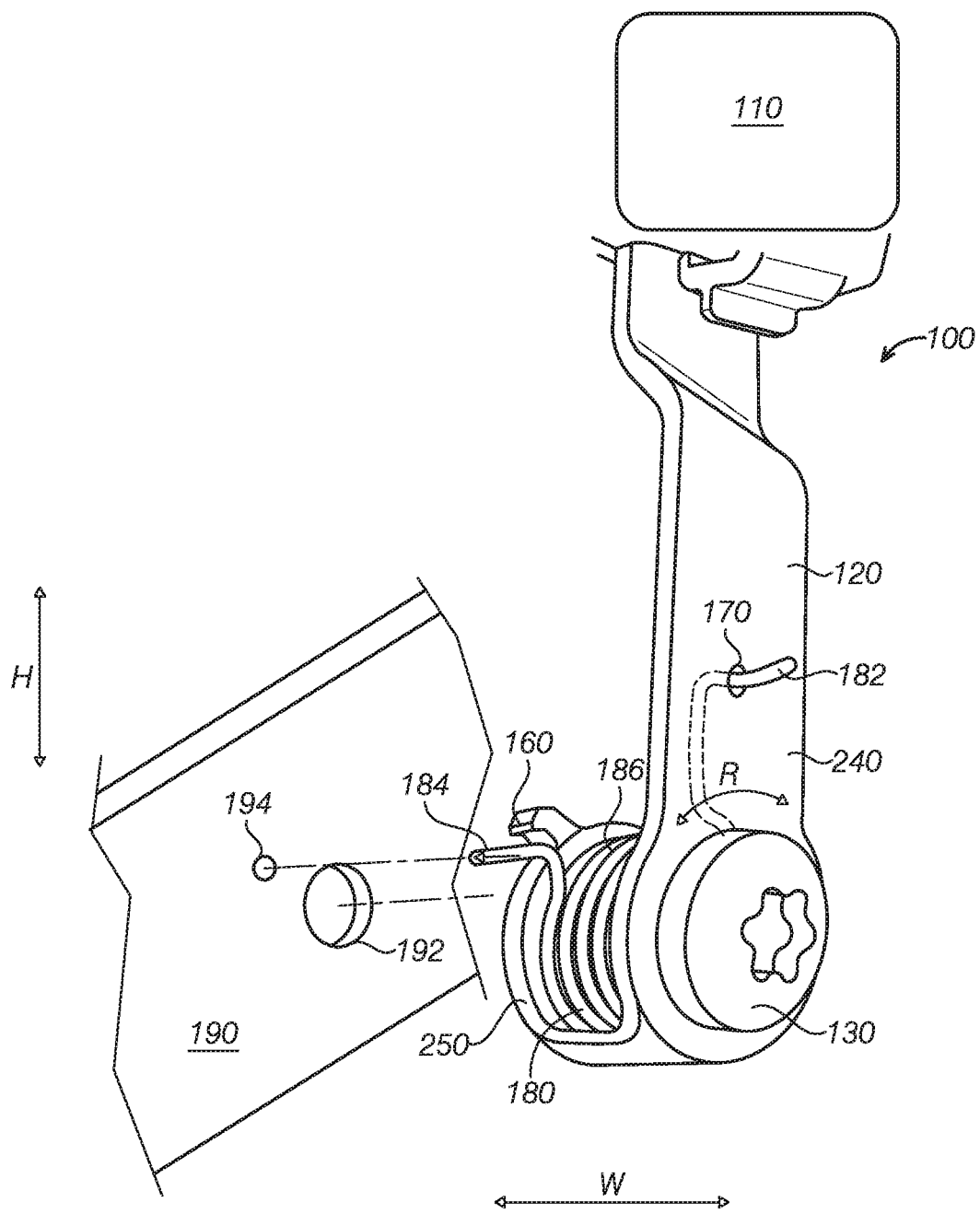
FIG. 1 depicts a perspective view of a seatbelt buckle assembly separated from a structural frame according to one embodiment of the present disclosure.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

A position of a vehicle seat back may usually be adjusted to meet need for a space and provide comfort to an occupant. At some circumstances, the seat back may be laid down. Under this circumstance, the seat back may interfere with a seatbelt buckle, even cause damage to the seatbelt if the seatbelt buckle deflects toward the seat due to gravity. The present application provides a seatbelt buckle assembly with reduced possibility of deflecting in a vehicle width direction. Specifically, and as mentioned herein elsewhere, a buckle supporting member connected to the buckle includes a first aperture and an opposing second aperture spaced apart along a width direction to receive a fastener for assembling the buckle supporting member to the structural frame.

Figure 2A:
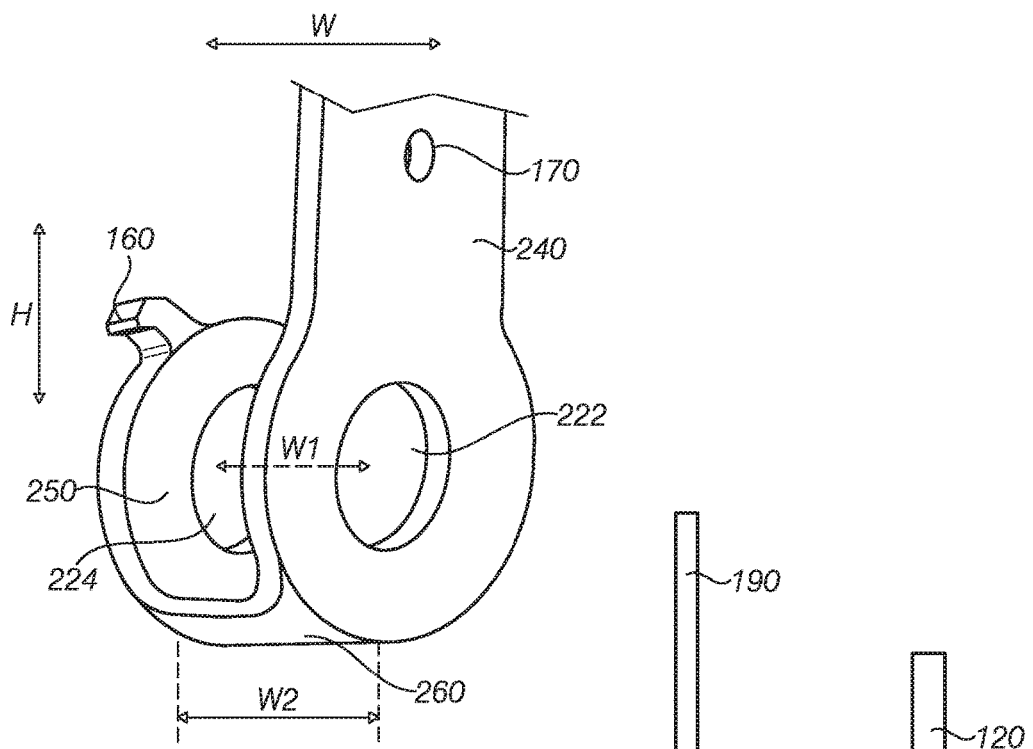
FIG. 2A depicts a partially enlarged perspective view of the buckle supporting member of the seatbelt buckle assembly referenced in FIG. 1.
Figure 2B:
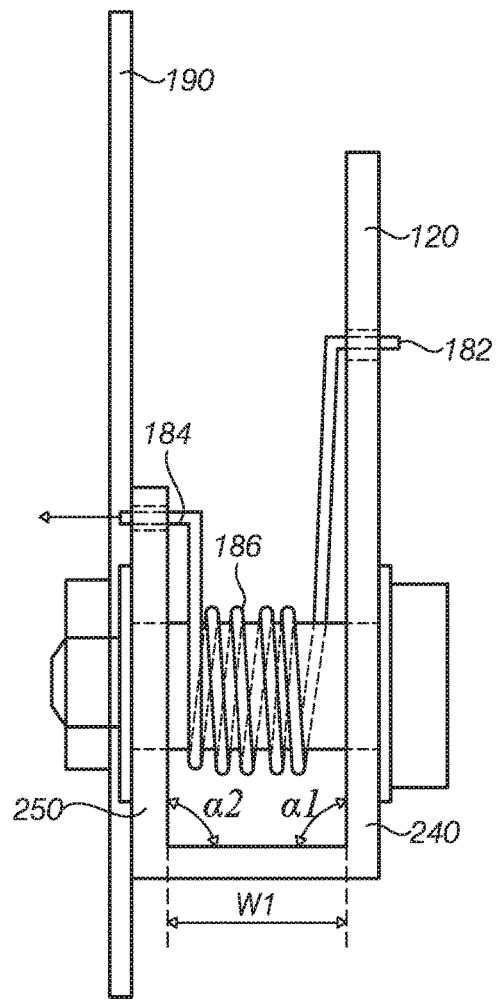
FIG. 2B depicts a side view of the seatbelt buckle assembly assembled to the structural frame referenced in FIG. 1.

Referring to FIG. 1 further in view of FIG. 2A and FIG. 2B, in one or more embodiments, a seatbelt buckle assembly generally shown at 100 may be mounted to a structural frame 190. The seatbelt buckle assembly 100 includes a buckle 110, a buckle supporting member 120 connected to the buckle 110 and a spring 180 that contacts the buckle supporting member 120 and the structural frame 190. The buckle supporting member 120 includes a first aperture 222 and an opposing second aperture 224 spaced apart together are used to receive a fastener 130 to mount the buckle supporting member 120 to the structural frame 190.

In one or more embodiments, the width direction W may be a width direction of a seat, which is also a width direction of a vehicle. However, it should be appreciated that a seat may have a number of configurations as needed. For instance, a seat may be transversely positioned at a length direction of the vehicle, in this case the width direction W may be a width direction of a seat, also a length direction of a vehicle.

Without wanting to be limited to any particular theory, the present invention in one or more embodiments is advantageous at least in that the buckle supporting member 120 includes a first aperture 222 and an opposing second aperture 224. A fastener 130 passes through the first and second apertures to secure the buckle support member 120 to a structural frame 190. A rotation of the buckle supporting member 120 along the width direction W due to itself gravity or deflection towards to or away from the seat back when a seat back is adjusted can be eliminated or reduced, and avoiding potential damage to the buckle 100 and reducing unwanted noise related to the twist and rotation.

Referring back to FIG. 2A and further in view of FIG. 1, the first aperture 222 and the second aperture 224 are spaced apart at a distance of W1 along the direction W. The distance W1 may be of a suitable value for positioning a portion of the spring 180 between first aperture 222 and the second aperture 224. The spring 180 may be a torsional spring and the portion of spring 180 positioned between the first aperture 222 and the second aperture 224 may have more than one loops or turns. In some embodiments as depicted in FIG. 1 and FIG. 2B, the spring 180 may include a body 186 and first and second ends 182, 184 positioned at two ends of the body 186. When assembling the seatbelt buckle assembly 100, the fastener 130 may pass through the first aperture 222 of a first part 240, the body 186 of the spring 180 and the second aperture 224 of a second part 250.

Referring back to FIG. 1 and FIG. 2B, the first end 182 and second end 184 of the spring 180 contact the first part 240 and the second part 250 of the buckle supporting member 120, respectively. The first end 182 may be attached to the first part 240 via any suitable method. For example, the first end 182 of the spring may wrap one or more rounds surrounding the first part 240 to be attached to the first part 240. In another example, as depicted in FIG. 1 and FIG. 2B, the first part 240 may include a third aperture 170 to receive therein the first end 182 of the spring 180 to attach the spring 180 to the first part 240. In some embodiments, both wrapping around the first part 240 and attachment via the third aperture 170 may be employed to strengthen the attachment.

The second end 184 may be attached to structural frame 190 via any suitable method. For example, the second end 184 of the spring 180 may wrap one or more rounds around the structural frame 190 to be attached to the structural frame 190. In another embodiment as depicted in FIG. 1 and FIG. 2B, the structural frame 190 may include a positioning hole 194 and to receive the second end 184 of the spring 180. In this configuration, the spring 180 not only acts as a torsional member, but also functions as a positioning member, thus omitting a positioning member that would be otherwise necessary, thus simplifying the structure and saving cost. In some embodiments, wrapping around the structural frame and attachment via the positioning hole 194 may be employed to strengthen the attachment.

In some embodiments as depicted in FIG. 1 and FIG. 2A-2B, the spring 180 may further contact the second part 250 via the second end 184. Without wanting to be limiting to any particular theory, the contact may help providing a suitable torsional stress within the seatbelt buckle assembly 100 before assembling the seatbelt buckle assembly 100 to the structural frame 190. The contact may be implemented via any suitable method. In one example, the second part 250 includes a protrusion 160 to stop movement of the second end 184 in one direction. The second part 250 can contact the second end 184 of the spring 180 when the second end 184 of the spring 180 laid against the protrusion 160. The protrusion 160 extends from the second part 250 in a direction away from the second aperture 224 to apply a resistance to the second end 184 of the spring 180 as needed.

Referring back to FIG. 1 and FIG. 2B, in one or more embodiments, the fastener 130 may be a head bolt with an elongated body to accommodate the distance WI between the first and second parts 240, 250. In addition, the structural frame 190 may include a mounting hole 192 formed thereon. When assembling, the fastener 130 may pass through the mounting hole 192 to pivotally mount the seatbelt buckle assembly 100 to the structural frame 190.

The first part 240 and the second part 250 may have any suitable shape and dimension, and any suitable position relative to each other such that unwanted twist or rotation along direction R may be advantageously reduced as mentioned herein and elsewhere.

Non-limiting examples of variable configurations are depicted in FIG. 1, FIG. 2A-2B and FIG. 3A-3D.

Figure 3A:
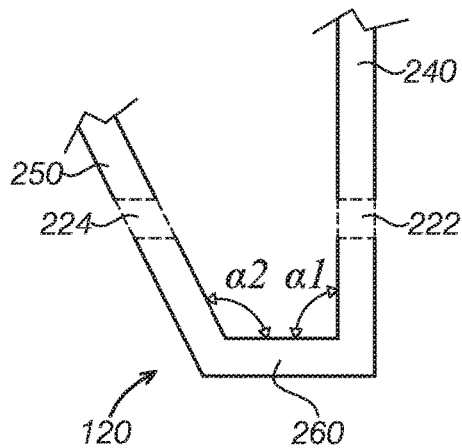
FIG. 3A depicts a cross-sectional view of the buckle supporting member of the seatbelt buckle assembly referenced in FIG. 1.

In one of non-limiting examples, and further in view of FIG. 2A-2B and FIG. 3A, the buckle supporting member 120 may further include a Riddle part 260 positioned between the first part 240 and the second part 250 and formed of a first angle $\alpha 1$ with the first part 240 and a second angle $\alpha 2$ with the second part 250. The first angel $\alpha 1$ and the second angle $\alpha 2$ may be any suitable value, and may be varied as needed to make the first aperture 222 opposed to the second aperture 224 in the width direction so as to position the fastener 130 therein. In one or more embodiments, the term "oppose" may refer to be at least partially overlapped in projection, for instance the projection of the first aperture 222 and the second aperture 224 are at least partially overlapped in height direction H and/or width direction W so as to receive there-through the fastener 130. Or a center or the first aperture 222 and a center of the second aperture 224 may be substantially in the same central axis. The first angle α1 and the second angle α2 may be the same or different. In addition, and as depicted in FIG. 3A in comparison to FIG. 2A, the second angle α2 may be of a value relative to the first angle α1 such that the second part 250 has a greater angle to the height direction H than the first part 240 has. Without wanting to be limited to any particular theory, this configuration is advantageous in keeping the second part 250 to be more closely aligned with the structural frame 190 for a greater engagement. In some embodiments, the first angle α1 and the second angle α2 may each be greater than zero and less than 120 degrees. In the embodiment depicted in FIGS. 2A and 2B, the first angle α1 and the second angle α2 may each be close to 90 degrees, such as in a range of 80 to 100 degrees or 85 to 95 degrees. In sonic embodiments the first part 240 and the second part 250 are substantially parallel each other and perpendicular to the middle part 260.

In the embodiment depicted in FIG. 2A, the middle part 260 may have a width W2 that is no more than 20 percent, 15 percent or 10 percent away in the value from the distance W1 along the width direction. Similarly, the width W2 of the middle part 260 may be inure than 20 percent, 15 percent or 10 percent away in value from the distance W1 along the width direction W.

Figure 3B:
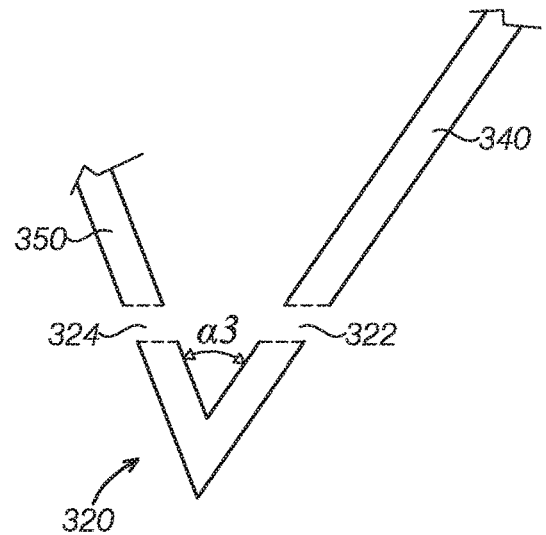
FIG. 3B depicts another cross-sectional view of the buckle supporting member of the seatbelt buckle assembly referenced in FIG. 1.

FIG. 3B illustrates an alternative embodiment. In the depicted embodiment, a first part 340 directly contacts a second part 350 or the first part 340 and the second part 350 are connected at their ends. The first part 340 has a third angle α3 with the second part 350. The first aperture 322 and the second aperture 324 are formed on the first part 340 and the second part 350, respectively. The third angle α3 may be an acute angle that is greater than zero and smaller than 90 degrees such that the first aperture 322 is opposed or aligned to the second aperture 324 in the width direction W.

Figure 3C:
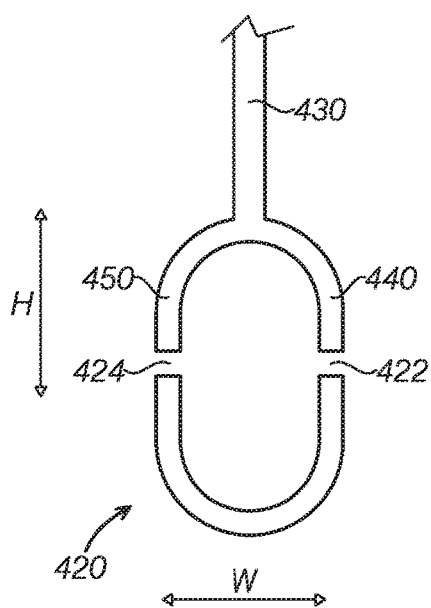
FIG. 3C depicts yet another cross-sectional view of the buckle supporting member of the seatbelt buckle assembly referenced in FIG. 1.

FIG. 3C illustrates an alternative embodiment of a buckle supporting member 420. In particular, the buckle supporting member 420 includes a main body 430 and a first part 440 and a second part 450. The first and second parts 440, 450 extend from the main body 430 as a branch, respectively. In some embodiments, each of the first part 440 and the second part 450 extends from an end of the main body and away from the main body and then bends down. The first part 440 includes a first aperture 422 and the second part 450 includes a second aperture 424, the first and second apertures 422, 424 are used to receive a fastener such as the fastener 130. While the first and second parts 240, 250 in FIG. 1, FIG. 2A-2B may be connected to each other at a relatively lower position and spaced apart from each other at a relatively upper position along the height direction H, on the contrary, the first and second parts 440, 450 may be connected to each other both at a relatively upper position and at a relatively lower position along the height direction H. In addition, the main body 430 does not have to be positioned in equal distance away from the first and second part 440, 450, and optionally may be positioned closer to any one of the first and second part 440, 450 along the width direction W. In some embodiments, the first and second parts 440, 450 form a loop.

Figure 3D:
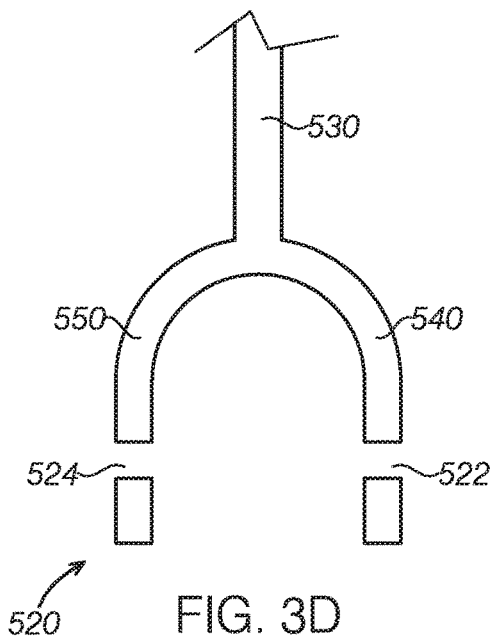
FIG. 3D depicts another cross-sectional view of the buckle supporting member of the seatbelt buckle assembly referenced in FIG. 1.

FIG. 3D illustrates another embodiment of a buckle supporting member 520. In particular, the buckle supporting member 520 includes a main body 530, a first part 540 and a second part 550. The first and second parts 540, 550 extend from the main body 530, respectively. In some embodiments, each of the first part 540 and the second part 550 extends from an end of the main body 530 and away from the main body 530 and then bends down. The first part 540 includes a first aperture 522 and the second part 550 includes a second aperture 524. The first and second apertures 522, 524 are used to receive a fastener such as the fastener 130. While the first and second parts 240, 250 as referenced in FIG. 1, FIG. 2A-2B may be connected to each other at a relatively lower position and spaced apart from each other at a relatively upper position along the height direction H, on the contrary, the first and second parts 540, 550 may be connected to each other at a relatively upper position and be spaced apart from each other at a relatively lower position along the height direction H. In addition, the main body 530 does not have to be positioned in equal distance away from the first and second part 540, 550 and optionally may be positioned closer to any one of the first and second part 540, 550 along the width direction W.

In one or more embodiments, for the sake of manufacturing and strength requirement, the first part 240, the second part 250 and the middle part 260 may be an integral one-piece, for example, via injection or compression molding. Similarly, the first part 340 and the second part 350 depicted in FIG. 3B may be an integral one-piece. Similarly, the first part 440 and the second part 450 depicted in FIG. 3C may be an integral one-piece. Similarly, the first part 440 and the second part 550 depicted in FIG. 3D may be an integral one-piece.

The buckle supporting member 120, 320, 420, 520 may be formed from any suitable materials, for example, including but not limited to metallic, plastic polymer.

In one or more embodiments, the structural frame 190 may be any suitable structural part, for example, a seat frame, a seat guiding ail or a vehicle floor. The buckle may be positioned close thereto via the seatbelt buckle assembly 100. Therefore, in one or more embodiments, the present disclosure also provides a seat assembly, which includes a seat frame 190; a buckle 110; a buckle supporting member 120 connected to the buckle 110 and including thereupon a first aperture 222 and an opposing second aperture 224 spaced apart along a width direction together to receive a fastener 130 for assembling the buckle supporting member 120 to the seat frame 190; and a spring 180 to contact with the buckle supporting member 120 and the seat frame 190.

In one or more embodiments, the present invention as set forth herein is believed to have overcome certain challenges associated with the seatbelt buckle assembly. However, one skilled in the art will readily recognize from such discussion, and from the accompanying drawings and claims that various changes, modifications and variations can be made therein without departing from the true spirit and fair scope of the invention as defined by the following claims.

The invention claimed is:

1. A seatbelt buckle assembly for use with a seat frame, comprising:
   a buckle;
   a buckle supporting member connected to the buckle and including thereupon a first aperture and an opposing second aperture spaced apart along a width direction together to receive a fastener to mount the buckle supporting member to the seat frame, wherein the buckle supporting member includes a first part and a second part, the first aperture and the second aperture being defined on the first part and the second part, respectively; and a spring adapted to be disposed around the fastener, wherein the spring is in direct contact with the buckle supporting member and the seat frame when the buckle supporting member and the spring are assembled to the seat frame, wherein the spring includes a first end, a second end and a body positioned there-between and extended along the width direction, and at least a portion of the body of the spring is positioned between the first and second parts of the buckle supporting member along the width direction, and wherein the spring is a torsion spring and has more than one turn arranged along the width direction.

2. The seatbelt buckle assembly of claim 1, wherein the buckle supporting member includes a main body, wherein each of the first part and the second part extends from an end of the main body and away from the main body and then bend down, and the first and second parts form a loop.

3. The seatbelt buckle assembly of claim 1, wherein the first part is connected to the second part, and forms an angle with the second part, wherein the first and the second parts are integrally formed as one-piece.

4. The seatbelt buckle assembly of claim 1, wherein the buckle supporting member further includes a middle part positioned between the first part and the second part, and the first part is substantially parallel to the second part.

5. The seatbelt buckle assembly of claim 1, wherein the buckle supporting member further includes a middle part positioned between the first part and the second part and has a first angle with the first part and a second angle with the second part, and each of the first angle and the second angle being greater than zero and less than 120 degrees.

6. The seatbelt buckle assembly of claim 1, wherein the buckle supporting member further includes a middle part positioned between the first part and the second part, and the first part, the second part and the middle part are integrally formed as one-piece.

7. The seatbelt buckle assembly of claim 1, wherein the first end and second end of the spring contact the first part and second part of the buckle supporting member, respectively.

8. The seatbelt buckle assembly of claim 7, wherein the second part further includes protrusion to contact the second end of the spring at an assembled position.

9. The seatbelt buckle assembly of claim 7, wherein the first part further includes a third aperture to receive the first end of the spring at an assembled position.

10. The seatbelt buckle assembly of claim 1, wherein the buckle supporting member include a main body, wherein each of the first part and the second part extends from an end of the main body and away from the main body and then bends down.

11. A seat assembly, comprising:
a seat frame;
a buckle;
a buckle supporting member connected to the buckle and including a first part and a second part spaced apart from the first part along a width direction, wherein the first part includes a first aperture and the second part includes a second aperture together to receive a fastener to mount the buckle supporting member to the seat frame; and a spring to contact directly with the buckle supporting member and the seat frame, wherein the spring includes a first end, a second end and a body positioned there-between and extended along the width direction, and at least a portion of the body of the spring is positioned between the first part and second part of the buckle supporting member along the width direction, wherein the first end and the second end of the spring respectively contact the first part and the second part of the buckle supporting member, and wherein the spring is a torsion spring and has more than one turn arranged along the width direction.

12. The seat assembly of claim 11, wherein the first part further includes a third aperture to receive the first end of the spring at an assembled position.

13. The seat assembly of claim 11, wherein the second part further includes a protrusion to contact the second end of the spring at an assembled position.

14. The seat assembly of claim 11, wherein the seat frame includes a positioning hole to contact an end of the spring.

15. A seatbelt buckle assembly for use with a structural frame, comprising:
a buckle;
a buckle supporting member connected to the buckle, wherein the buckle supporting member includes a first part having a first aperture, a second part opposing the first part and having a second aperture, and a middle part positioned between the first part and the second part, and wherein the first part, the second part and the middle part are integrally formed as one-piece;
a fastener disposed between the first part and the second part to mount the buckle supporting member to the structural frame; and
a spring disposed around the fastener and connected with the buckle supporting member and the structural frame.

16. The seatbelt buckle assembly of claim 15, wherein the first part further includes a third aperture to receive the first end of the spring at an assembled position.

17. The seatbelt buckle assembly of claim 15, wherein the spring includes a first end, a second end and a body positioned there-between, the first end and second end of the spring contact the first part and second part of the buckle supporting member, respectively.

18. The seatbelt buckle assembly of claim 17, wherein at least a portion of the body of the spring is positioned between the first and second parts of the buckle supporting member along a width direction.

* * * * *